United States Patent
Yang (10) Patent No.: US 9,952,696 B2
(45) Date of Patent: Apr. 24, 2018

(54) ARRAY SUBSTRATE, METHOD FOR CONTROLLING THE SAME, LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/422,350

(22) PCT Filed: Jun. 5, 2014

(86) PCT No.: PCT/CN2014/000559
§ 371 (c)(1),
(2) Date: Feb. 18, 2015

(87) PCT Pub. No.: WO2015/051586
PCT Pub. Date: Apr. 16, 2015

(65) Prior Publication Data
US 2016/0216811 A1    Jul. 28, 2016

(30) Foreign Application Priority Data
Oct. 12, 2013  (CN) .......................... 2013 1 0474334

(51) Int. Cl.
*G06F 3/041* (2006.01)
*G06F 3/044* (2006.01)
(Continued)

(52) U.S. Cl.
CPC .......... *G06F 3/0412* (2013.01); *G02F 1/1368* (2013.01); *G02F 1/13338* (2013.01);
(Continued)

(58) Field of Classification Search
CPC ...... G06F 3/0412; G06F 3/0416; G06F 3/044; G06F 2203/04111; G02F 1/13338;
(Continued)

(56) References Cited

U.S. PATENT DOCUMENTS

| 7,480,019 | B2 | 1/2009 | Itami et al. | |
|---|---|---|---|---|
| 2006/0232559 | A1* | 10/2006 | Chien | G06F 3/044 345/168 |
| 2015/0160495 | A1* | 6/2015 | Yang | G02F 1/13338 349/12 |

FOREIGN PATENT DOCUMENTS

| CN | 102341774 | 2/2012 |
|---|---|---|
| CN | 102341774 A | 2/2012 |

(Continued)

OTHER PUBLICATIONS

Alley, Charles L.; Atwood, Kenneth W. Electronic Engineering, 1966, 2nd Ed. New York: John Wiley & Sons.*
(Continued)

*Primary Examiner* — Stephen Sherman
(74) *Attorney, Agent, or Firm* — Womble Bond Dickinson (US) LLP (57) ABSTRACT

An array substrate comprises a substrate, transistors arranged on the substrate, a first transparent electrode electrically connected with a drain of the transistor, and a second transparent electrode arranged between the first transparent electrode and the substrate. The first transparent electrode comprises strip-shaped electrodes electrically connected with each other. The second transparent electrode corresponds to the first transparent electrode and comprises
(Continued)

electrode sets insulated from each other. Each of the plurality of electrode sets comprises two sub-electrodes arranged in the same layer, insulated from each, and arranged in a staggered and complementary manner. The sub-electrodes of the second transparent electrode act as a common electrode in a first preset time and a touch control electrode in a second preset time. A method for controlling the array substrate and a liquid crystal display device are also disclosed. The touch control function can be integrated in the array substrate, simplifying structure of the display device.

2 Claims, 5 Drawing Sheets (51) Int. Cl.
    *G02F 1/1333*     (2006.01)
    *G02F 1/1343*     (2006.01)
    *G02F 1/1368*     (2006.01)

(52) U.S. Cl.
    CPC .... *G02F 1/13439* (2013.01); *G02F 1/134309* (2013.01); *G02F 1/134363* (2013.01); *G06F 3/044* (2013.01); *G06F 3/0416* (2013.01); *G02F 2001/134345* (2013.01); *G02F 2001/134372* (2013.01); *G06F 2203/04111* (2013.01)

(58) Field of Classification Search
    CPC .......... G02F 1/134309; G02F 1/13439; G02F 1/1368; G02F 2001/134345
    USPC ....................................... 345/174; 178/18.06
    See application file for complete search history.

(56) References Cited

FOREIGN PATENT DOCUMENTS

| | | |
|---|---|---|
| CN | 103309094 | 9/2013 |
| CN | 103309094 A | 9/2013 |
| CN | 203178977 | 9/2013 |
| CN | 203178977 U | 9/2013 |
| CN | 103488009 A | 1/2014 |
| CN | 203502710 U | 3/2014 |
| WO | WO 2010088670 A1 * | 8/2010 ........... G06F 3/0412 |

OTHER PUBLICATIONS

Chinese Office Action with English Translation dated Apr. 11, 2016, Chinese Application No. 201310474334.8, 6 pages.
English Translation of International Search Report and Written Opinion in PCT/CN2014/000559 dated Apr. 16, 2015. 7 pages.
English Translation of Office Action in Chinese Application No. 2013104743348. 8 pages.
Chinese Office Action with English Language Translation, dated Dec. 1, 2015, Chinese Application No. 201310474334.8.

\* cited by examiner

Fig. 7

# ARRAY SUBSTRATE, METHOD FOR CONTROLLING THE SAME, LIQUID CRYSTAL DISPLAY DEVICE

FIELD OF THE INVENTION

The present invention relates to the field of technique for touch liquid crystal display, and particularly to an array substrate, a method for controlling the same, and a liquid crystal display device comprising the same.

BACKGROUND ART

Due to the rapid development of the display technique, the advent of touch panel (TP) brings the user a more convenient life.

The touch panel comprises an Add-On touch panel and an In-Cell touch panel. In the In-Cell touch panel, a touch panel with a touch sensor (i.e., a touch driving electrode and a touch sensing electrode) is integrated in the display panel, and generally is arranged between the array substrate and the liquid crystal layer of the display panel. In the In-Cell touch panel, it is possible to realize a display touch panel which has the display and touch control function and is simply in structure.

The touch sensing for the In-Cell touch panel is conducted in a capacitance mode, which can be further divided into a self capacitance mode and a mutual capacitance mode. The self capacitance In-Cell touch panel has been widely applied due to its advantages of simple in fabrication and low power consumption. The touch control principle is to utilize the electrical field of the human body. When the user's finger is approaching a light output side of the display panel (and thus approaching the touch panel), the parasitic capacitance (Cp) between the touch driving electrode and the touch sensing electrode will vary in its magnitude. Whether a touch occurs can be determined by a terminal system which is connected with the touch driving electrode and the touch sensing electrode, and each position of touch point can be accurately determined, thus realizing the touch and display function.

In the self capacitance In-Cell touch panel, it is required to arrange the additional touch driving electrode and touch sensing electrode in the existing array substrate and the liquid crystal layer. This not only increases the number of patterning processes, which leads to increase in production cost, but also affects the light transmittance of the display panel.

SUMMARY

Embodiments of the present invention provide an array substrate, a method for controlling the same, and a liquid crystal display device comprising the same. In the present invention, a touch control electrode can be integrated in the array substrate, thus avoiding increase the number of patterning processes. In case the array substrate is applied to a liquid crystal display device, the display and touch control function can be realized, thus simplifying structure of the liquid crystal display device, and improving light transmittance of the liquid crystal display device.

To this end, the following solutions are adopted in embodiments of the present invention.

In one aspect, embodiments of the present invention provide an array substrate, comprising: a substrate, a plurality of transistors which are arranged on the substrate, a first transparent electrode which is electrically connected with a drain of the transistor, and a second transparent electrode which is arranged between the first transparent electrode and the substrate; the first transparent electrode comprises a plurality of strip-shaped electrodes which are electrically connected with each other; the second transparent electrode corresponds to the first transparent electrode and comprises a plurality of electrode sets which are arranged in the same layer and insulated from each other, and each of the plurality of electrode sets comprises two sub-electrodes which are insulated from each other and arranged in a staggered and complementary manner; wherein the sub-electrodes of the second transparent electrode act as a common electrode in a first preset time and a touch control electrode in a second preset time.

Preferably, each sub-electrode has a right-angled triangle like shape; the right-angled triangle like shape comprises a first right-angle side which is parallel with the gate line, a second right-angle side which is parallel with the data line, and a serrated hypotenuse; wherein the array substrate further comprises a gate line which is electrically connected with a gate of the transistor and a data line which is electrically connected with a source of the transistor.

More preferably, the first right-angle side of each sub-electrode is parallel with the first right-angle sides of the remaining sub-electrodes.

Preferably, the gate line are arranged in pairs, each pair of gate lines is arranged in a parallel manner between two neighboring rows of first transparent electrodes; wherein the gate line in each pair of gate lines is electrically connected with the closer row of gate; for each sub-electrode, the array substrate further comprises a plurality of secondary metal wires which are electrically connected with said each sub-electrode, and the secondary metal wires and the gate lines are arranged in parallel and in the same layer; wherein the secondary metal wires are arranged between any two neighboring rows of first transparent electrodes which are not provided with the pair of gate lines.

More preferably, each secondary metal wire is electrically connected with one of the sub-electrodes by means of a plurality of via holes which are arranged uniformly.

Preferably, the array substrate further comprises a plurality of primary metal wires and a driving IC which is connected with the plurality of primary metal wires, wherein each primary metal wire is electrically connected with the plurality of secondary metal wires which are electrically connected with one of the sub-electrodes; the driving IC is configured to provide a common electrode driving signal to the sub-electrodes in the first preset time and a touch self-sensing signal to the sub-electrodes in the second preset time.

Embodiments of the present invention provide a liquid crystal display device, which comprises any of the above-mentioned array substrate.

Preferably, the liquid crystal display device further comprises a color film substrate over which a black matrix is arranged; wherein in each electrode set of the array substrate, two sub-electrodes which are insulated from each other and arranged in a staggered and complementary manner are spaced by an interval, and the interval corresponds to the black matrix and has an area less than or equal to that of the black matrix.

In another aspect, embodiments of the present invention provide a method for controlling any of the above-mentioned array substrate, which comprises: inputting a common electrode driving signal to the sub-electrodes of the second transparent electrode of the array substrate and a pixel electrode driving signal to the first transparent electrode of the array substrate in the first preset time, and inputting a touch self-sensing signal to the sub-electrodes of the second transparent electrode in the second preset time.

Preferably, inputting the common electrode driving signal to the sub-electrodes of the second transparent electrode of the array substrate in the first preset time comprises: inputting the common electrode driving signal by the driving IC to the sub-electrode via the primary metal wires in the first preset time; and inputting the touch self-sensing signal to the sub-electrodes in the second preset time comprises: inputting the touch self-sensing signal by the driving IC to the sub-electrodes via the primary metal wires in the second preset time.

Embodiments of the present invention provide an array substrate, a method for controlling the same, and a liquid crystal display device comprising the same. The array substrate comprises a substrate, a plurality of transistors which are arranged on the substrate, a first transparent electrode which is electrically connected with a drain of the transistor, and a second transparent electrode which is arranged between the first transparent electrode and the substrate; the first transparent electrode comprises a plurality of strip-shaped electrodes which are electrically connected with each other; the second transparent electrode comprises a plurality of electrode sets which are arranged in the same layer and insulated from each other, each electrode set comprises two sub-electrodes which are insulated from each other and arranged in a staggered and complementary manner, and each sub-electrode corresponds to a plurality of the first transparent electrodes; wherein the sub-electrodes act as a common electrode in a first preset time and a touch control electrode in a second preset time. Since the second transparent electrode is arranged as a plurality of electrode sets which are insulated from each other, and each electrode set comprises sub-electrodes which are insulated from each other and arranged in a staggered and complementary manner, it is possible for the sub-electrodes to act as the common electrode in the first preset time and the touch control electrode in the second preset time. In this way, it is not necessary to provide additional patterned layers to integrate the touch control electrode in the array substrate. In case the array substrate is applied to the liquid crystal display device, the display and touch control function can be realized, thus simplifying structure of the liquid crystal display device. In addition, since it is not necessary to provide additional patterned layers to integrate the touch control electrode in the array substrate, it is possible to avoid decrease in light transmittance of the liquid crystal display device.

BRIEF DESCRIPTION OF DRAWINGS

This and other aspects of the present invention will now be described in more detail, with reference to the appended drawings showing currently preferred embodiments of the present invention.

DETAILED DESCRIPTION OF EMBODIMENTS

Several technical solutions of the present disclosure will be described in more detail below with reference to the accompanying drawings in order for those skilled in the art to be able to carry out the present disclosure. The present disclosure may, however, be embodied in many different forms and should not be construed as limited to embodiments set forth herein. These embodiments do not limit the present disclosure, but the present disclosure is only limited by the appended claims.

The reference numerals in drawings are explained as follow: 01 array substrate; 10 substrate; 11 transistor; 12 first transparent electrode; 120 strip-shaped electrode; 13 second transparent electrode; 130 electrode set; 1301 sub-electrode; 1301a first right-angle side; 1301b second right-angle side; 1301c interval; 14 gate line; 15 data line; 16 secondary metal wires; 160 via hole; 17 primary metal wire; 02 color film substrate; and 03 liquid crystal layer.

Figure 1:
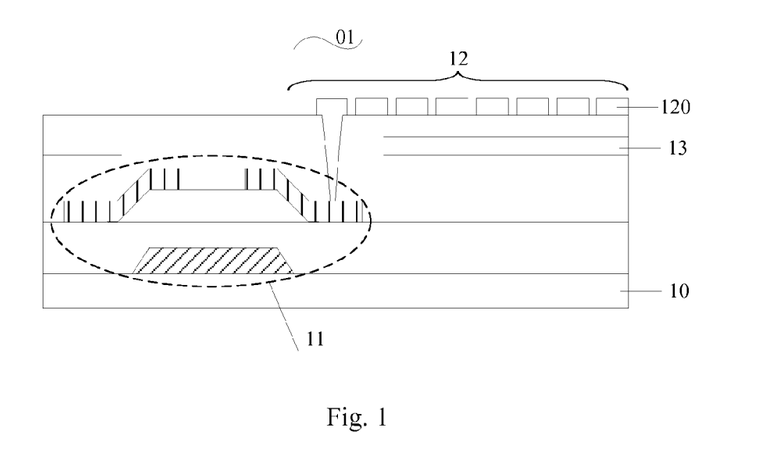
FIG. 1 is a cross-sectional view illustrating an array substrate in embodiments of the present invention.
Figure 2:
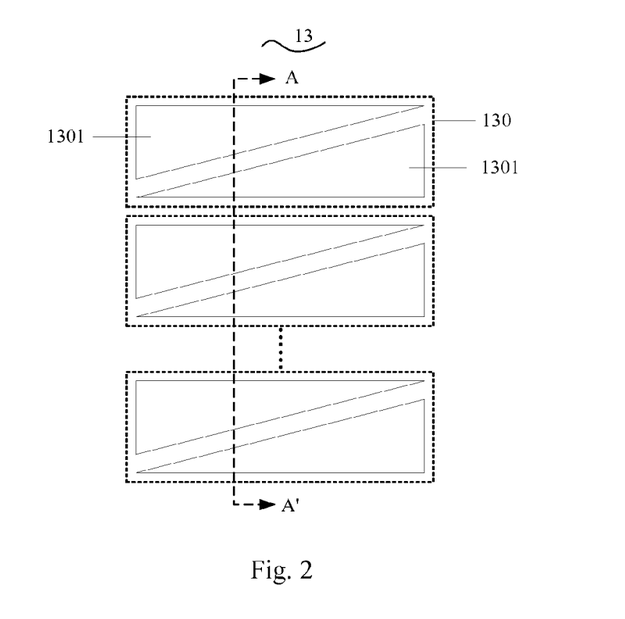
FIG. 2 is a top view illustrating electrode sets of an array substrate in embodiments of the present invention.
Figure 3:
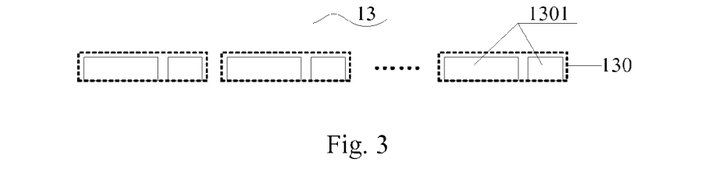
FIG. 3 is cross-sectional view along A-A' in FIG. 2 illustrating electrode sets of the array substrate.

Embodiments of the present invention provide an array substrate 01. As shown in FIG. 1, the array substrate 01 comprises a substrate 10, a plurality of transistors 11 which are arranged on the substrate, a first transparent electrode 12 which is electrically connected with a drain of the transistor, and a second transparent electrode 13 which is arranged between the first transparent electrode 12 and the substrate 10. The first transparent electrode 12 comprises a plurality of strip-shaped electrodes 120 which are electrically connected with each other. As shown in FIGS. 2-3, the second transparent electrode 13 comprises a plurality of electrode sets 130 which are arranged in the same layer and insulated from each other. Each electrode set 130 comprises two sub-electrodes 1301 which are insulated from each other and arranged in a staggered and complementary manner, and each sub-electrode 1301 corresponds to a plurality of first transparent electrodes 12.

The sub-electrodes 1301 act as a common electrode in a first preset time and a touch control electrode in a second preset time.

The transistor 11 comprises a gate, a gate insulating layer, an active layer, a source, and a drain. Preferably, the transistor 11 is a thin film transistor.

Here, the first preset time refers to a display period for realizing the image display function in case the array substrate 01 is applied to the liquid crystal display device; the second preset time refers to a touch period for realizing the touch control function in case the array substrate 01 is applied to the liquid crystal display device. In practice, the sub-electrodes are drove in a time sharing mode (i.e., drove separately in the first preset time and in second preset time). Namely, in the first preset time, the sub-electrodes 1301 act as a common electrode, the first transparent electrode 12 acts as a pixel electrode, and a voltage for realizing image display function is applied to the sub-electrodes 1301 and the first transparent electrode 12, thus realizing image display function. In the second preset time, the sub-electrodes 1301 act as a touch control electrode 15, a voltage for realizing the touch control function is applied to the sub-electrodes 1301, and the first transparent electrode 12 is brought into a non-operating state to avoid effects on the touch control.

Figure 4:
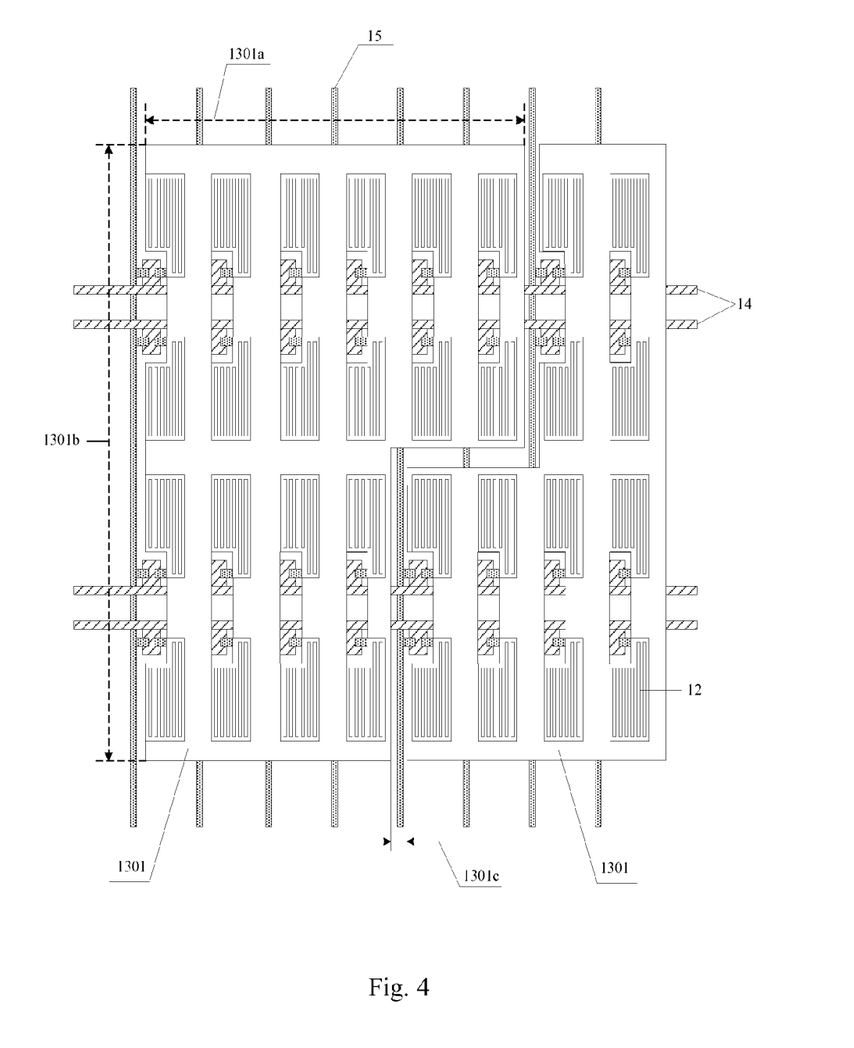
FIG. 4 is an enlarged top view illustrating an array substrate in embodiments of the present invention.

Based on the foregoing, the sub-electrodes 1301 act as a common electrode in the first preset time. Each sub-electrode 1301 corresponds to a plurality of first transparent electrodes 12 (i.e., pixel electrodes) over the sub-electrodes. In display units defined by the plurality of first transparent electrodes 12, the sub-electrodes 1301 which act as the common electrode have a plate shape. In addition, each first transparent electrode 12 comprises a plurality of strip-shaped electrodes which are electrically connected with each other. In this way, in the plurality of display units, a multi-dimensional electrical field can be formed between the strip-shaped electrodes 120 in different planes and the plate-shaped sub-electrodes 1301. When the array substrate 01 is applied to the liquid crystal display device, the multi-dimensional electrical field renders the liquid crystal molecules in the liquid crystal cell to rotate, thus realizing image display function. In particularly, as shown in FIG. 4, in the first preset time, each sub-electrode 1301 correspond to the plurality of first transparent electrodes 12 over the sub-electrode, and the sub-electrodes 1301 act as a common electrode. The plurality of first transparent electrodes 12 corresponding to the sub-electrodes 1301 act as a counter electrode, and realize image display function of the liquid crystal display device when a voltage is applied.

In the second preset time, the sub-electrodes 1301 act as touch control electrode. Parasitic capacitance (Cp) will be developed between two sub-electrodes 1301 of the same electrode set 130. Due to an electrical field of the human body, when a finger contacts a light output side of the liquid crystal display device, the finger acts as a conductor, and external capacitance (Cf) is formed between the finger and the electrode set 130 on the array substrate. The external capacitance (Cf) and the parasitic capacitance (Cp) in the electrode set 130 form a coupling electrical field between the electrode set 130 and the finger. The coupling electrical field will change the magnitude of the parasitic capacitance (Cp). Based on variation of the position of touch point capacitance, the position of touch point can be determined by calculation, thus realizing touch control function.

It is noted that, firstly, in embodiments of the present invention, a bottom-gate transistor is taken as an example in FIG. 1 for explaining the position relations between the transistor 11 and the first and second transparent electrodes 12, 13. However, embodiments of the present invention are not limited to this example. The transistor 11 can also be a top-gate thin film transistor.

Secondly, the first transparent electrode 12 and the second transparent electrode 13 can be made from a transparent conductive material like ITO (Indium Tin Oxide) or IZO (Indium Zinc Oxide).

Thirdly, as shown in FIG. 2, in embodiments of the present invention, the staggered and complementary sub-electrodes 1301 can be formed as follow. A transparent conductive thin film is formed on the substrate. After a patterning process, the transparent conductive thin film is divided into a plurality of electrode sets 130 which are insulated from each other. Each electrode set 130 is also divided into two sub-electrodes 1301. In each electrode set 130, two sub-electrodes 1301 have two sides which are insulated from each other and arranged in a staggered and complementary manner. When one of the two sides has a certain shape, the other side has a corresponding shape which engages with the certain shape. Further, in order to determine accurately the position of touch point when the sub-electrodes 1301 is operated in the touch period, two sub-electrodes 1301 preferably have the same shape and area.

The present embodiment provides an array substrate 01, which comprises a substrate 10, a plurality of transistors 11 which are arranged on the substrate, a first transparent electrode which is electrically connected with a drain of the transistor 12, and a second transparent electrode 13 which is arranged between the first transparent electrode 12 and the substrate 10. The first transparent electrode 12 comprises a plurality of strip-shaped electrodes 120 which are electrically connected with each other, and the second transparent electrode 130 comprises a plurality of electrode sets 130 which are arranged in the same layer and insulated from each other. Each electrode set 130 comprises two sub-electrodes 1301 which are insulated from each other and arranged in a staggered and complementary manner, and the sub-electrodes 1301 correspond to a plurality of first transparent electrodes 12. Since the second transparent electrode 13 is arranged as a plurality of electrode sets 130 which are insulated from each other, and each electrode set comprises sub-electrodes 1301 which are insulated from each other and arranged in a staggered and complementary manner, it is possible for the sub-electrodes 1301 to act as the common electrode in the first preset time and the touch control electrode in the second preset time. In this way, it is not necessary to provide additional patterned layers to integrate the touch control electrode in the array substrate 01. In case the array substrate 01 is applied to the liquid crystal display device, the display and touch control function can be realized, thus simplifying structure of the liquid crystal display device. In addition, since it is not necessary to provide additional patterned layers to integrate the touch control electrode in the array substrate, it is possible to avoid decrease in light transmittance of the liquid crystal display device.

Preferably, as shown in FIG. 4, each sub-electrode 1301 has a right-angled triangle like shape, which comprises a first right-angle side 1301a parallel with a gate line 14, a second right-angle side 1301b parallel with a data line 15, and a serrated hypotenuse.

The array substrate 01 further comprises the gate line 14 electrically connected with the gate of the transistor 11 and the data line 15 electrically connected with the source of the transistor 11.

It is noted that, if the sub-electrodes 1301 completely covers the transistor 11, parasitic capacitance may be developed between the sub-electrodes and the source/drain electrode, which may affect performance of the transistor 11. Thus, in embodiments of the present invention, the sub-electrodes 1301 are preferably hollowed out at a portion corresponding to the transistor 11, as shown in FIG. 4. In this way, from the microscopic view (taking a pixel as the unit), the second right-angle side 1301b parallel with the data line 15 will not be a straight line. However, since the transistor 11 is relatively small in its size, the portion which is hollowed out can be ignored from the macroscopic view (taking a display panel as the unit), and the second right-angle side 1301b can be regarded as a straight line.

In addition, in order to avoid the lack of the touch control electrode or a display defect in a certain region during forming the second transparent electrode 13, it is preferred to divide along the gate lines 14 and the data line 15 so as to obtain rectangular electrode sets 130, during dividing the deposited transparent conductive thin film into the plurality of electrode sets 130 which are insulated from each other.

In each electrode set 130, two sub-electrodes 1301 are arranged in a staggered manner, and the sub-electrodes 1301 in each electrode set 130 are insulated from each other. Thus, it is necessary to form an interval 1301c between opposite hypotenuses of two sub-electrodes 1301, as shown in FIG. 4.

Reference is made to the microscopic view in FIG. 4. It can be seen that, when the sub-electrodes 1301 are formed, each sub-electrode 1301 has to correspond to a plurality of whole first transparent electrodes 12, thus avoiding display defect. Therefore, to ensure the integrity of the plurality of display units defined by the plurality of first transparent electrodes 12 and each sub-electrode 1301, the right-angled triangle like shape has a zigzag hypotenuse. Namely, when two vertexes for connecting the hypotenuse the right-angled triangle like shape are known, the hypotenuse may consist of connection lines along the gate line 14 and the data line 15, thus avoiding incomplete display in some display units.

Figure 5:
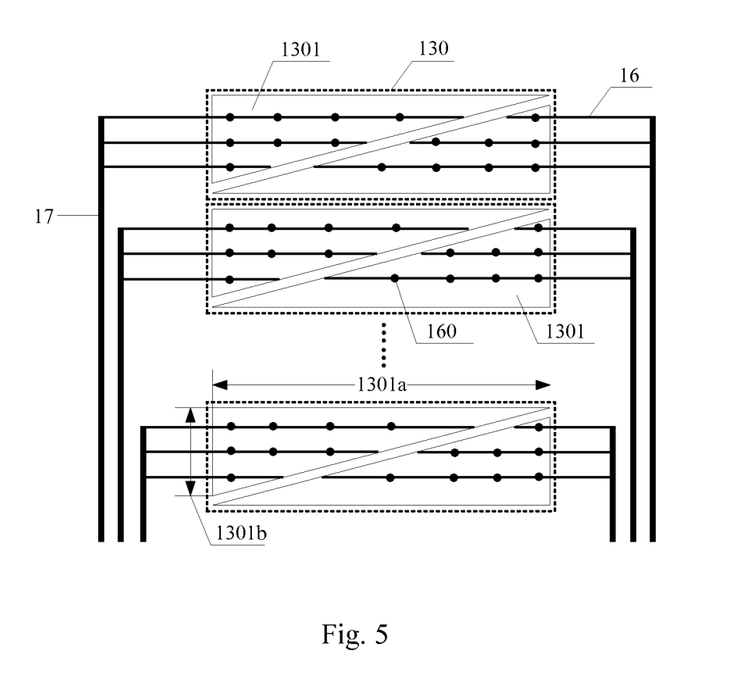
FIG. 5 is an overall top view illustrating the array substrate in FIG. 4.

From the macroscopic view, as shown in FIG. 5, it is more preferred that the first right-angle side 1301a of each sub-electrode 1301 is parallel with the first right-angle side 1301a of the remaining sub-electrodes 1301.

Here, no matter the sub-electrode 1301 acts as the common electrode or the touch control electrode, a driving signal is required to be applied to the sub-electrode 1301, and the driving signal is generally supplied by a driving IC. This requires a connection line for conducting the signal which is connected with the sub-electrode 1301. The connection line is usually arranged in the peripheral region. Thus, the first right-angle side 1301a parallel with the gate line can be set to have the same width with the display area in the direction of the gate line, so that the existing common electrode line can act as the above-mentioned connection line, thus avoiding additional wiring, which reduces the number of processes and difficulty. Of course, if a connection line is added which is connected with the driving IC, the first right-angle side 1301a can be set to parallel with the data line.

Here, in case the array substrate is applied to the liquid crystal display device, an effective contact width between the finger and the liquid crystal display device is generally 5.0 mm. Since the electrode set 130 has a shape like a rectangle, by controlling a short side of the rectangle (i.e., each second right-angle side 1301b) in a range of 3.0~5.0 mm, it is possible to ensure each electrode set 130 has a maximum touch area of 5.0×5.0 mm$^2$. As a result, in tests with a normal touch width of 5.0 mm, it is guaranteed that the tester's finger can contact two sub-electrodes 1301 of the same electrode set 130, thus changing the magnitude of the parasitic capacitance (Cp). In this way, it is possible for a terminal system connected with the electrode set 130 to accurately determine the position of touch point.

It is noted that, each display unit has a relatively small size, and the second right-angle side 1302 of each sub-electrode 1301 has a length not more than 5.0 mm. Thus, as shown in FIG. 5, i.e., the overall top view of the array substrate 01, the zigzag hypotenuse of the right-angled triangle like shape is approximately a straight line. That is, the sub-electrodes 1301 has a shape which looks like a right-angled triangle.

More preferably, as shown in FIG. 4, the gate lines 14 are arranged in pairs, each pair of gate lines is arranged between two neighboring rows of first transparent electrodes 12. The gate line in each pair of gate lines 14 is electrically connected with the closer row of gate. As for each sub-electrode 1301, as shown in FIG. 5, the array substrate 01 further comprises a plurality of secondary metal wires 16 which are electrically connected with one of the sub-electrodes 1301, and the secondary metal wires 16 and the gate lines 14 are arranged in the same layer and are parallel with each other. In addition, the secondary metal wires 16 are arranged between any two neighboring rows of first transparent electrodes which are not provided with the pair of gate lines 12.

Here, the secondary metal wires 16 can be replaced by the common electrode lines in the existing array substrate.

Further, the sub-electrodes 1301 are generally made from a transparent material of large resistance like ITO. A large resistance tends to increase the electrode signal delay of the array substrate 01 (also as RC-Loading). The secondary metal wires 16 are generally made from a metallic material with a small resistance. Thus, by electrically connecting each secondary metal wire 16 with one of the sub-electrodes 1301 by means of a plurality of via holes 160 which are arranged uniformly, the sub-electrodes 1301 of large resistance and the secondary metal wires 16 of small resistance are connected in parallel. According to the equation for a parallel resistance, the effective resistance in a parallel circuit is smaller than any sub-resistance in the parallel circuit. In this way, the resistance of the sub-electrodes 1301 can be reduced, and thus the electrode signal delay of the array substrate 01 can be improved.

Further, the array substrate further comprises a plurality of primary metal wires 17, and a driving IC which is connected with the plurality of primary metal wires. Each primary metal wire 17 is electrically connected with the plurality of secondary metal wires 16 which are electrically connected with one of the sub-electrodes 1301.

A timing signal is applied to the driving IC, so that in the first preset time (i.e., a display period for realizing the image display function), the driving IC provides a common electrode driving signal to the sub-electrodes 1301, while in the second preset time (i.e., a touch period for realizing user touch control function), the driving IC provides a touch self-sensing signal to the sub-electrodes 1301.

By reference to FIG. 6, a timing diagram for display and touch control function, the operating principle of the array substrate 01 in embodiments of the present invention will be explained.

Figure 6:
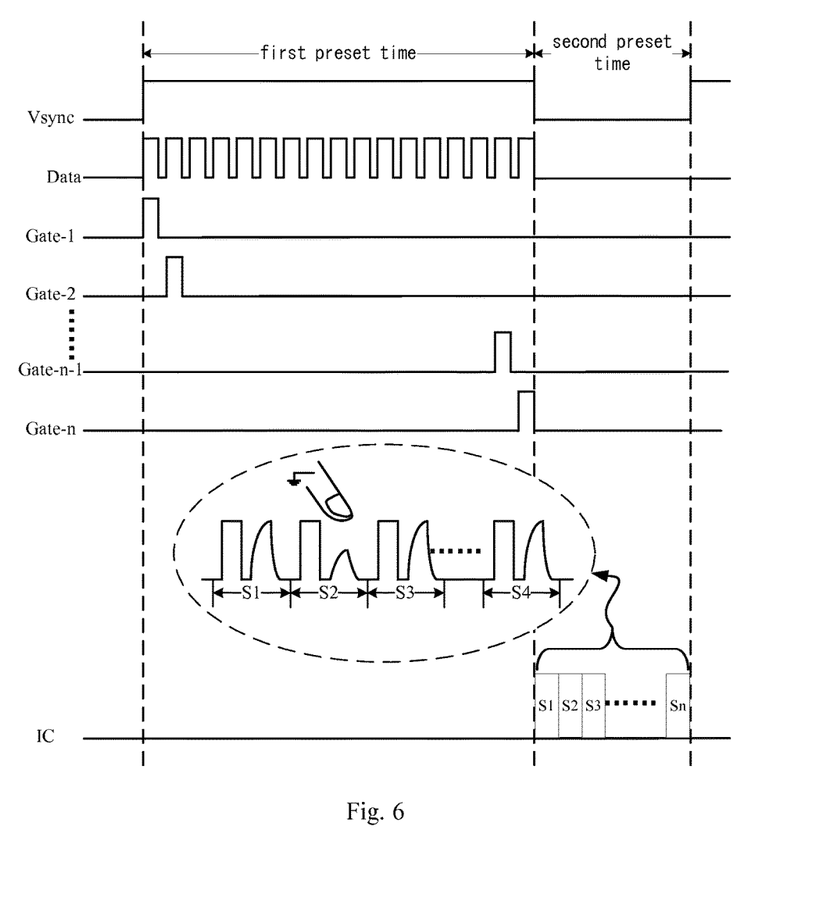
FIG. 6 is a timing diagram for image display and touch control function of an array substrate in embodiments of the present invention.

In FIG. 6, Vsync is a timing signal. In the first preset time, driving signals (labeled as Gate-1, Gate-1 . . . Gate-n) are successively applied to each row of gate lines 14, so that the gate of the transistor 11 which is connected with each row of gate lines 14 is turned on. Each row of first transparent electrodes 12 is charged with the signal (labeled as Data) which is applied to the data line 15. At the same time, the driving IC applies a constant voltage, e.g., 5V, to all sub-electrodes 1301. In this way, the sub-electrodes 1301 act as the common electrode, and the first transparent electrode 12 acts as the pixel electrode. The sub-electrodes 1301 and the first transparent electrode 12 can produce a multi-dimensional electrical field, thus realizing display function of the array substrate 01.

In the first preset time, once the last row of first transparent electrodes 12 is charged, the display function of the array substrate 01 is complete, and the second preset time is followed. In the second preset time, the driving IC successively applies self-sensing signals (labeled as S1, S2 . . . Sn) to electrode sets 130 of the second transparent electrode. When the finger touches a region corresponding to one of the electrode sets 130, the magnitude of the parasitic capacitance (Cp) is changed, and the occurrence of touch is sensed through the change of the self-sensing signal, thus realizing the touch control function of the array substrate 01.

In second preset time, since no driving signal is applied to the gate line 14 and the data line 15, the first transparent electrodes 12 are brought into a non-operating state to avoid effects on the touch control.

Figure 7:
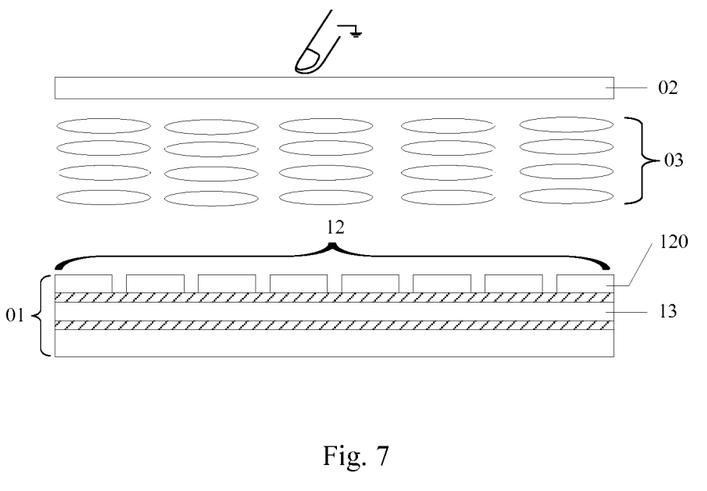
FIG. 7 is a cross-sectional view illustrating a liquid crystal display device in embodiments of the present invention.

Embodiments of the present invention further provide a liquid crystal display device. As shown in FIG. 7, the liquid crystal display device comprises any of the above-mentioned array substrate 01. Of course, the liquid crystal display device can further comprise a color film substrate 02 and a liquid crystal layer 03 which is arranged between the array substrate 01 and the color film substrate 02.

The liquid crystal display device can be a product or component with any display function, such as a liquid crystal display, a liquid crystal TV, a digital photo frame, a mobile phone, a tablet computer.

Further, a black matrix is arranged on the color film substrate 02. In each electrode set 130 of the array substrate 01, the interval 1301*c* between two sub-electrodes 1301 which are insulated from each other and arranged in a staggered and complementary manner (referring to FIG. 4) corresponds to the black matrix, and the interval 1301*c* has an area not more than that of the black matrix. In this way, a case is avoided in which the interval is a relatively large, so that the sub-electrodes 1301 has a reduced area, which may leads to display defect in some display units among the plurality of display units defined by the plurality of first transparent electrodes 12 corresponding to the sub-electrodes 1301.

Hereinafter, a liquid crystal display device comprising any one of the above-mentioned array substrate 01 is described in a specific embodiment. As shown in FIG. 7, the liquid crystal display device comprises any one of the array substrate 01 as described above, the color film substrate 02, and the liquid crystal layer 03 which is arranged between the array substrate 01 and the color film substrate 02.

As shown in FIGS. 1 and 4, the array substrate 01 comprises a substrate 10, a plurality of transistors 11 which are arranged on the substrate, a first transparent electrode 12 which is electrically connected with a drain of the transistor 11, and a second transparent electrode 13 which is arranged between the first transparent electrode 12 and the substrate 10. Further, the array substrate 01 further comprises a gate line 14 which is electrically connected with the gate of the transistor 11 and a data line 15 which is electrically connected with the source of the transistor 11.

Further, referring to FIG. 4, the gate lines 14 are arranged in pairs, each pair of gate lines are arranged in a parallel manner between two neighboring rows of first transparent electrodes 12. The gate lines in each pair of gate lines 14 are electrically connected with the two neighboring rows of gate. Referring to FIG. 5, as for each sub-electrode 1301, the array substrate 01 further comprises a plurality of secondary metal wires 16 and a primary metal wire 17 which are electrically connected with one of the sub-electrodes 1301. The secondary metal wires 16 and the gate line 14 are arranged in a parallel manner and in the same layer. The secondary metal wires 16 are arranged between any two neighboring rows of first transparent electrodes 12 which are not provided with the pair of gate lines. Each secondary metal wire 16 is electrically connected with one of the sub-electrodes 1301 by means of a plurality of via holes 160 which are arranged uniformly.

The first transparent electrode 12 comprises a plurality of strip-shaped electrodes 120 which are electrically connected with each other. The second transparent electrode 13 comprises a plurality of electrode sets 130 which are insulated from each other. Each electrode set comprises two sub-electrodes 1301 which are arranged in the same layer, insulated from each, and arranged in a staggered and complementary manner. In the first preset time (i.e., display period), the sub-electrodes 1301 act as a common electrode, while in the second preset time (i.e., touch period), the sub-electrodes 1301 act as a touch control electrode.

Further, each sub-electrode 1301 has a right-angled triangle like shape, which comprises a first right-angle side 1301*a* parallel with the gate line 14, a second right-angle side 1301*b* parallel with the data line 15, and a serrated hypotenuse. The first right-angle side 1301*a* in each sub-electrode 1301 is parallel with the first right-angle sides 1301*a* of the remaining sub-electrodes 1301.

Here, an effective contact width between the finger and the liquid crystal display device is generally 5.0 mm. Since the electrode set 130 has a shape like a rectangle, by controlling a short side of the rectangle (i.e., each second right-angle side 1301*b*) in a range of 3.0~5.0 mm, it is possible to ensure each electrode set 130 has a maximum touch area of 5.0×5.0 mm$^2$. As a result, in tests with a normal touch width of 5.0 mm, it is guaranteed that the tester's finger can contact two sub-electrodes 1301 of the same electrode set 130, thus changing the magnitude of the parasitic capacitance (Cp). In this way, it is possible for a terminal system connected with the electrode set 130 to accurately determine the position of touch point.

Further, in order to realize the display mode and touch mode of the liquid crystal display device, the array substrate 01 further comprises a driving IC which is connected with the primary metal wires. A timing signal is applied to the driving IC, so that in the first preset time (i.e., a display period for realizing the image display function), the driving IC provides a common electrode driving signal to the sub-electrodes 1301, while in the second preset time (i.e., a touch period for realizing user touch control function), the driving IC provide a touch self-sensing signal to the sub-electrodes 1301.

Reference is further made to FIG. 6. The operating principle of the liquid crystal display device for realizing the display mode and the touch mode in a time sharing manner is described, in which the liquid crystal display device has a typical scanning frequency of 60 Hz and each frame of image has 1208×800 pixels.

The liquid crystal display device has a typical scanning frequency of 60 Hz, indicating a duration of about 16.67 ms for each frame. For transistors on the array substrate in most liquid crystal display devices, the width for gate driving is relatively small, so that the time for scanning a frame of image in a progressive manner is always smaller than a normal time set for each frame of image (i.e., 16.67 ms). In view of this, the liquid crystal display device has a time margin when it is used to display an image. The time margin may vary according to the number of pixels for each frame of image, and is in the order of several milliseconds (ms). In the time margin, the liquid crystal display device is in an idle state. In the liquid crystal display device of the present invention, this time margin is utilized as a touch sensing time for the touch control electrode 15, so that the operation timing for touch sensing and that for image displaying are separated from each other, and the liquid crystal display device thus has display and touch control function.

Thus, provided that the normal display function of the liquid crystal display device is not affected, the time for the display period is 12.67 ms. During this period, the sub-electrodes 1301 act as a common electrode, the first transparent electrode 12 acts as a pixel electrode, and the sub-electrodes 1301 and the first transparent electrode 12 can produce a multi-dimensional electrical field for realizing display function.

Based on this, when displaying of a frame of image is complete, an idle state prior to displaying of the next frame of image can be used as the touch period. Since the display time for each frame of image in the liquid crystal display device is about 16.67 ms, the duration of the touch period is 4 ms. During this period, the first transparent electrodes 12 are brought into a non-operating state, the sub-electrodes 1301 act as a touch control electrode, and the driving IC successively applies self-sensing signals to electrode sets 130 of the second transparent electrode. When the finger touches the region to which one of the electrode sets 130 corresponds, the magnitude of the parasitic capacitance (Cp) will be changed, and the occurrence of touch is sensed through the change of the self-sensing signal, thus realizing the touch control function.

The display period of 12.67 ms and the touch period of 4 ms as described above only intend to describe an example of the embodiment of the present invention. In practice, the display period is not limited to 12.67 ms, and the touch period is not limited to 4 ms. For example, when the liquid crystal display device has a scanning frequency of 80 Hz in a high speed mode, durations for the display period and the touch period should be adjusted accordingly so as to fulfill the display and touch control function of the liquid crystal display device.

Embodiments of the present invention provide a liquid crystal display device, which comprises any of the above-mentioned array substrate 01, a color film substrate 02, and a liquid crystal layer 03 between the array substrate 01 and the color film substrate 02. In the first preset time, the sub-electrodes 1301 can act as a common electrode, the sub-electrodes 1301 and the first transparent electrodes 12 produce a multi-dimensional electrical field for controlling rotation of molecules of the liquid crystal layer 03, thus realizing the display function of the liquid crystal display device. In the second preset time, the sub-electrodes 1301 can act as a touch control electrode, thus realizing the touch control function of the liquid crystal display device. In this way, it is possible to realize the display and touch control function of the liquid crystal display device, and simplify the structure of the liquid crystal display device. Further, since no additional touch panel is added to the liquid crystal display device, which avoids decrease in light transmittance of the liquid crystal display device.

Embodiments of the present invention further provide a method for controlling any of the above-mentioned array substrate 01, which comprises: in the first preset time, inputting a common electrode driving signal to sub-electrodes 1301 of the second transparent electrode 13 in the array substrate 01, and inputting a pixel electrode driving signal to the first transparent electrodes 12 in the array substrate 01; and in the second preset time, inputting a touch self-sensing signal to the sub-electrodes 1301.

In particular, in the first preset time, the sub-electrodes 1301 act as a common electrode 14, and successively apply driving signals to each row of gate lines 14 to turn on the gate of transistor 11 which is connected with each row of gate lines 14, and each row of first transparent electrodes 12 is charged with the signal on the data line 15. At the same time, the driving IC applies a common electrode driving signal, e.g., 5V, to all sub-electrodes 1301 via the primary metal wire 17. In this way, the sub-electrodes 1301 act as a common electrode, the first transparent electrode 12 acts as pixel electrode, and the sub-electrodes 1301 and the first transparent electrode 12 produce a multi-dimensional electrical field, thus realizing the display function of the array substrate 01.

In the first preset time, once the last row of first transparent electrodes 12 is charged, the display function of the array substrate 01 is complete, and the second preset time is followed. In the second preset time, the sub-electrodes 1301 act as a touch control electrode, the driving IC successively applies touch self-sensing signals to electrode sets 130 of the second transparent electrode via the primary metal wire 17. When the finger touches a region corresponding to one of the electrode sets 130, the magnitude of the parasitic capacitance (Cp) is changed, and the occurrence of touch is sensed through the change of the self-sensing signal, thus realizing the touch control function of the array substrate 01.

In second preset time, since no driving signal is applied to the gate line 14 and the data line 15, the first transparent electrodes 12 are brought into a non-operating state to avoid effects on the touch control.

It is noted that, in all embodiments of the present invention, the case in which the drain of the transistor is electrically connected with the first transparent electrode is taken as an example. However, it will be appreciated by the skilled in the art that, since the source and the drain of the transistor are exchangeable in terms of structure and composition, the source of the transistor can also be electrically connected with the first transparent electrode, and this is equivalent to the above embodiments of the present invention. It will be also appreciated by the skilled in the art that the accompanying drawings present schematic views of the array substrate for clearly illustrating details relevant with the inventive concept of the present invention, and the irrelevant portions are partially or not illustrated in these drawings.

Although the present invention has been described above with reference to specific embodiments, it should be understood that the limitations of the described embodiments are merely for illustrative purpose and by no means limiting. Instead, the scope of the disclosure is defined by the appended claims rather than by the description, and all variations that fall within the range of the claims are intended to be embraced therein. Thus, other embodiments than the specific ones described above are equally possible within the scope of these appended claims.

What is claimed is:

1. A method for controlling an array substrate,
wherein the array substrate comprises a substrate, a plurality of transistors which are arranged on the substrate, a first transparent electrode which is electrically connected with a drain of the transistor, and a second transparent electrode which is arranged between the first transparent electrode and the substrate,
wherein the first transparent electrode comprises a plurality of strip-shaped electrodes which are electrically connected with each other,
wherein the second transparent electrode corresponds to the first transparent electrode and comprises a plurality of electrode sets which are arranged in the same layer and insulated from each other, and each of the plurality of electrode sets comprises two sub-electrodes which are insulated from each other and arranged in a staggered and complementary manner,
wherein the sub-electrodes of the second transparent electrode act as a common electrode in a first preset time and a touch control electrode in a second preset time, and wherein in the second preset time, parasitic capacitance is developed between two sub-electrodes of a same electrode set of the second transparent electrode, external capacitance is formed between a foreign object approaching the array substrate and the electrode set on the array substrate, and the parasitic capacitance is subject to change in a magnitude due to a coupling electrical field between the foreign object and the electrode set, and wherein the method comprises,
inputting a common electrode driving signal to the sub-electrodes of the second transparent electrode of the array substrate and a pixel electrode driving signal to the first transparent electrode of the array substrate in the first preset time; and
inputting a touch self-sensing signal to the sub-electrodes of the second transparent electrode in the second preset time, wherein a change in the touch self-sensing signal comprises information of the change in magnitude of the parasitic capacitance between two sub-electrodes of a same electrode set of the second transparent electrode.

2. The method of claim 1, wherein,
inputting the common electrode driving signal to the sub-electrodes of the second transparent electrode of the array substrate in the first preset time comprises: inputting the common electrode driving signal by the driving IC to the sub-electrode via the primary metal wires in the first preset time; and
inputting the touch self-sensing signal to the sub-electrodes in the second preset time comprises: inputting the touch self-sensing signal by the driving IC to the sub-electrodes via the primary metal wires in the second preset time.

* * * * *